United States Patent [19]
Mavrin et al.

[11] Patent Number: 5,415,561
[45] Date of Patent: May 16, 1995

[54] ELECTRONIC DEVICE INTERFACE CONNECTOR ASSEMBLY

[75] Inventors: Zvonko Mavrin, Bramalea; Milorad Lukovic, Toronto, both of Canada

[73] Assignee: Motorola, Inc., Schaumburg, Ill.

[21] Appl. No.: 143,960

[22] Filed: Nov. 1, 1993

[51] Int. Cl.⁶ .............................. H01R 4/50
[52] U.S. Cl. .................... 439/341; 439/272; 439/353
[58] Field of Search ............ 439/271, 272, 76, 341, 439/350, 353, 357, 358, 376

[56] References Cited

U.S. PATENT DOCUMENTS

| | | | |
|---|---|---|---|
| 3,897,994 | 8/1975 | Errichiello | 439/697 |
| 4,415,219 | 11/1983 | Kuhl et al. | 439/694 |
| 4,433,889 | 2/1984 | Ratchford et al. | 439/272 |
| 4,636,016 | 1/1987 | Ford, Jr. | 439/77 |
| 5,092,788 | 3/1992 | Pristupa, Jr. et al. | 439/225 |
| 5,148,353 | 9/1992 | Morgan et al. | 439/341 X |

*Primary Examiner*—Khiem Nguyen
*Attorney, Agent, or Firm*—Andrew S. Fuller

[57] ABSTRACT

A connector assembly (100) is provided for electrically interfacing to an electronic device (190), the electronic device (190) having an interface (192) with captivating portions (195, 197). The connector assembly (100) includes a connector housing (110), electrical contacts (143) carried by the housing (110), and a latching mechanism. The latching mechanism includes first and second latching members (130, 135) attached to the connector housing (110), the first latching member (130) being pivotably attached. Each latching member (130, 135) has an engaging portion (131, 136) to engage a captivating portion (195, 197) on the device (190). A resilient biasing member (160) engages the device (190) and biases the engaging portions (131, 136) of the latching members (130, 135) against the captivating portions (195, 197).

14 Claims, 6 Drawing Sheets

ELECTRONIC DEVICE INTERFACE CONNECTOR ASSEMBLY

TECHNICAL FIELD

This invention relates in general to connectors, and in particular, to connectors used to provide electrical interfacing for an electronic device.

BACKGROUND

Electrical connectors are frequently used to provide an electrical interface between an electronic device, such as a radio or other communication device, and an external accessory. These connectors often utilize multiple electrical contacts to handle electrical signals over several lines of communications. Ordinarily, an electrical connection between the accessory and the device is made by physically attaching a connector assembly to the electronic device, such that the electrical contacts of the connector engages complementary electrical contacts, or ports, on the electronic device. The connector assembly must be rigidly secured to ensure that proper electrical contact is made and maintained between the connector and the electrical ports of the electronic device while the connector is in use.

To ensure proper electrical contact between the connector and the electronic device, many of the existing connector assemblies employ springs, screws, or other fastener combinations, which help to secure the connector to the device housing. These solutions tend to require additional components to be built into the connector or the device housing or both. FIG. 1 depicts an electronic device 10 with an attached prior art accessory connector 20. The connector 20 is attached to the device housing 13 using a screw 25. The screw 25 is needed to ensure that a tight fit is maintained between the connector 20 and the housing 13, and a tool may be needed to properly tighten the screw 25. Additionally, the use of a screw 25 requires that a screw socket (not shown), such as a metal insert, is mounted within the device housing 13, to protect the integrity of the device housing 13, but which ultimately makes the device 10 more expensive to manufacture. Similar arrangements are typical in the art.

Prior art solutions which address the need to secure proper electrical coupling between the connector and electronic device tend to be bulky and difficult to use. Moreover, there are tooling, procurement, and other manufacturing costs, which are necessitated by the extra components needed to facilitate the manufacture of prior art connectors. With the increasing design requirements for smaller and more compact electronic devices, the resultant form factor of today's smaller devices is not convenient for multi-part connectors which require extra components on the device housing to facilitate connection. Therefore, there exists a need for an improved connector assembly, which provides the required connection rigidity for proper electrical contact, and which offers improved operational convenience and lower manufacturing costs.

DETAILED DESCRIPTION OF THE PREFERRED EMBODIMENT

Generally, the present invention provides for an improved external electrical interface connector, such as an accessory connector, for electrically interfacing an external device to an electronic device. The connector provides a rigidly secure interface, while ensuring that proper electrical contact is maintained between electrical contacts on the connector and electrical ports on the electronic device. The connector incorporates integral latching members, which engage complementary captivating portions on the body of the electronic device. The connector further includes a compressible seal which enhances the rigidity of the mechanical connection between the connector and the device housing, hence enhancing the integrity of the electrical connection.

Figure 1:
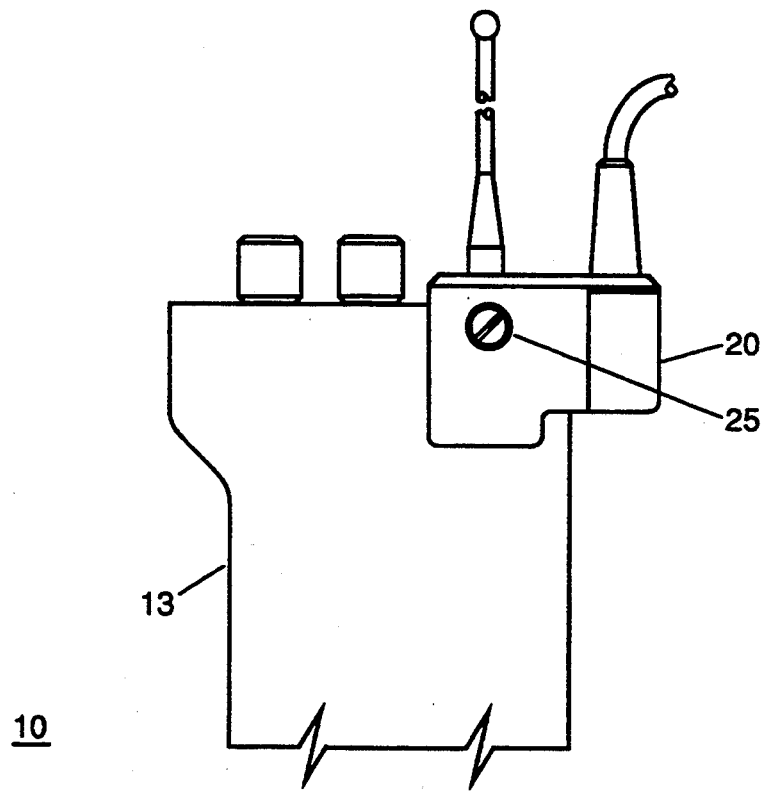
FIG. 1 is a prior art connector attached to an electronic device.
Figure 2:
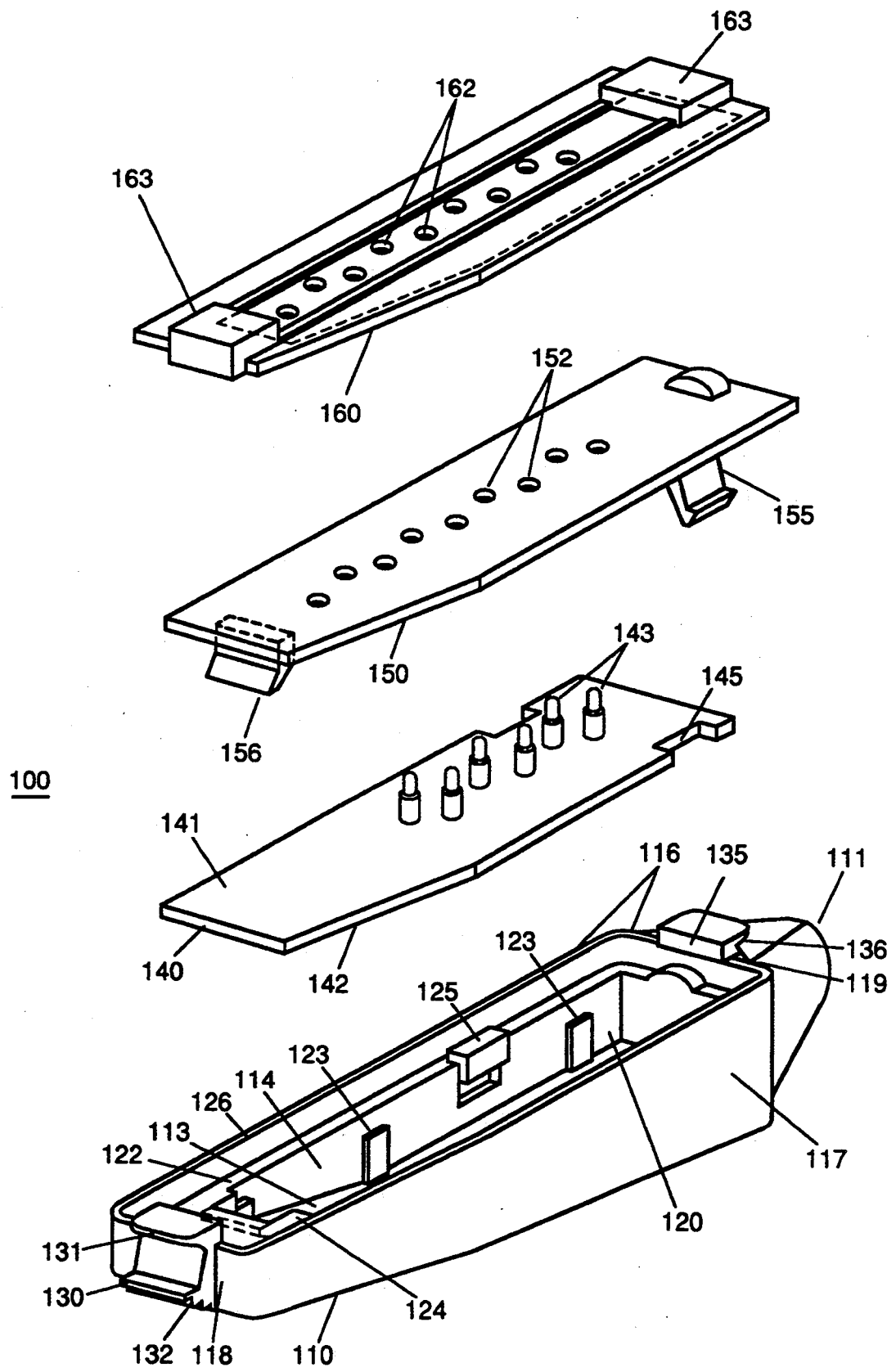
FIG. 2 is an exploded perspective view of a connector assembly, in accordance with the present invention.
Figure 3:
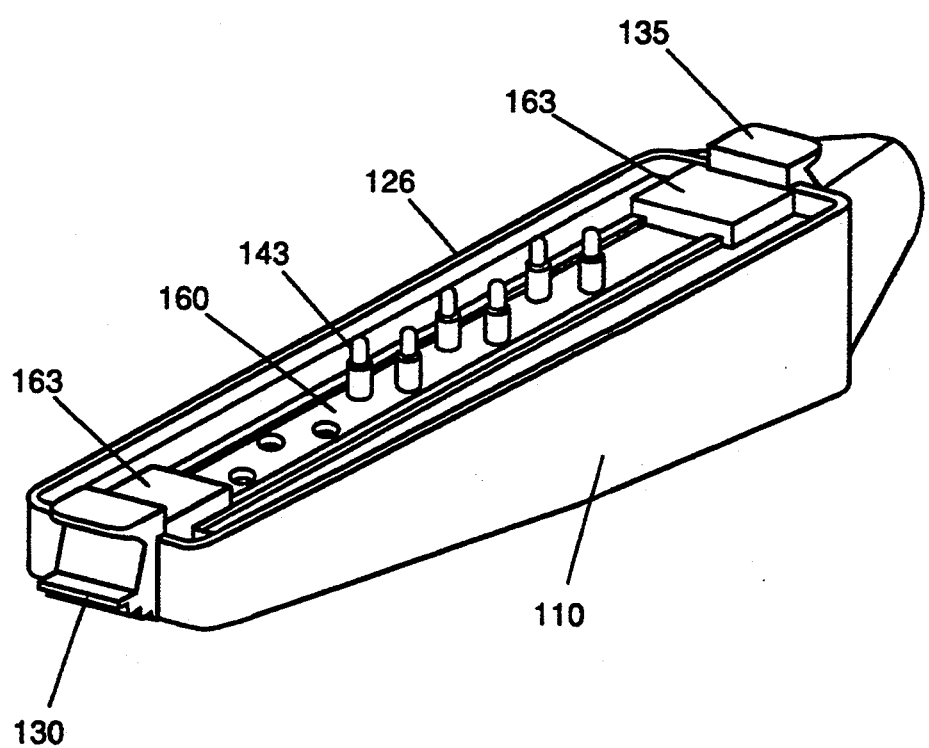
FIG. 3 is a perspective view of the connector assembly of FIG. 2.
Figure 4:
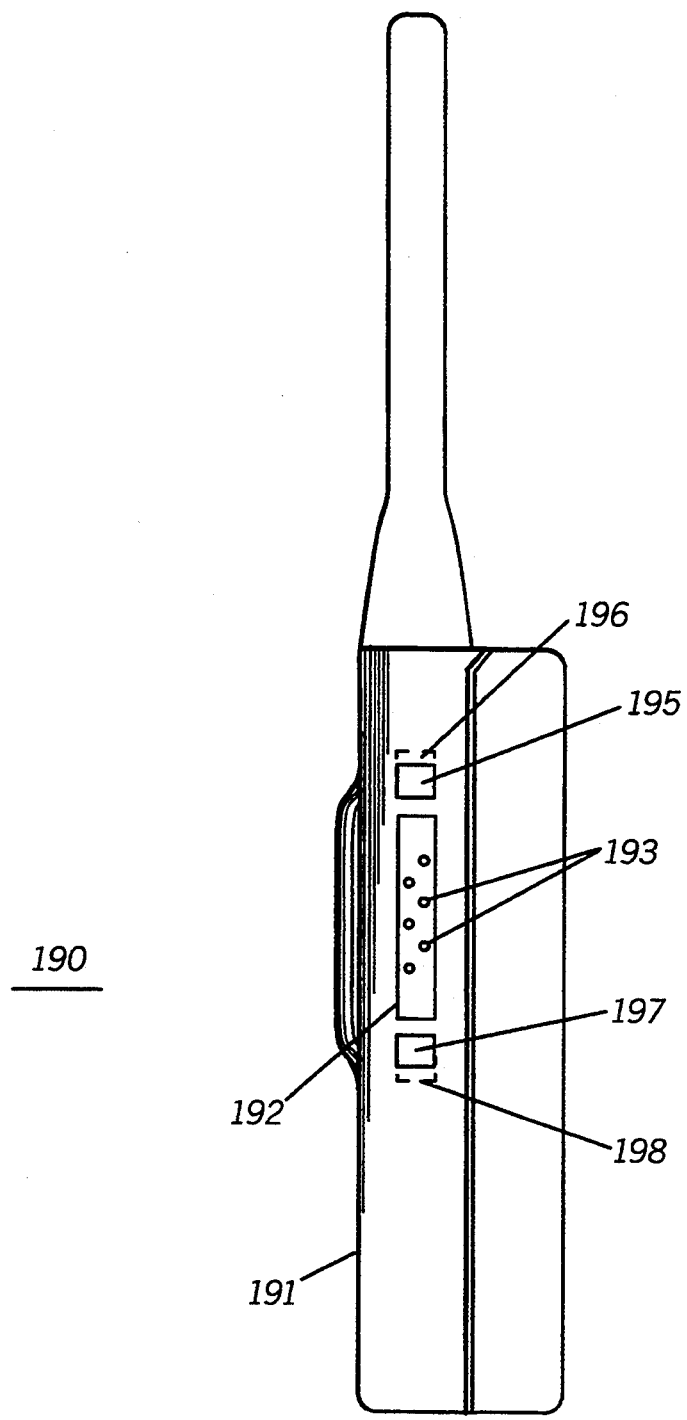
FIG. 4 is a side view of a radio having an external electrical interface.

The present invention can be more fully understood with reference to FIGS. 2, 3, and 4. FIG. 2 is an exploded perspective view of the external electrical interface connector 100, which is a radio 190 accessory connector 100 in the preferred embodiment. The accessory connector 100 includes the connector housing 110, a plurality of electrical contacts in the form of connector pins 143 mounted on a substrate 140, a protective cover or base plate 150, and a compressible seal 160.

The connector housing 110 is formed from plastic or other suitable materials. The housing 110 has a base portion 113, with four depending sidewalls 116 extending therefrom, thereby forming an open-faced hollow compartment, or well 114, having an interior surface 120 and an exterior surface 117. The housing 110 also has an opening 111 to accommodate an electrical conduit (not shown) such as a cable. A recessed ledge 122 is formed on the interior surface 120 of the housing 110 which extends circumferentially along the sidewalls 116. The housing 110 has a plurality of mounting guides 123, 124 for the base plate 150 and substrate 140, in the form of protrusions 123 on the interior surface 120 and at least one channel 124 along one of the sidewalls 116. A recessed area 125 located on the interior surface 120 of a sidewall forms a retainer 125 for the base plate 150.

The sidewalls 116 terminate along the open face of the housing 110 to form a substantially planar rectangular shaped mating interface 126 for the connector 100. A first latching member 130 is formed within a first opposing sidewall 118. The first latching member 130 has an engaging lip portion 131 projecting away from the body of the housing 110. The first latching member 130 is anchored toward the base portion 113 of the housing 110 and is pivotable about that anchoring point. A force applied to the first latching member 130 in a direction toward the body of the housing 110 causes the first latching member 130 to pivot in the direction of the force. However, the first latching member 130 is resilient and exerts a reactionary torsional force, or spring like property, about the anchoring point when pivoted, thereby urging the first latching member 130 back to its original position. The first latching member 130 has a curved gripping surface 132 with friction enhancers disposed thereon. The gripping surface 132 facilitates the application of a pivotable force upon the first latching member 130 by an operator's thumb or finger. A second latching member 135 is integrally formed on the mating interface 126 of the connector 100 proximate to a second opposing sidewall 119. In the preferred embodiment, the second latching member 135 is substantially rigid or fixed, however, the second latching member 135 could be pivotable, similar to the first latching member 130. The second latching member 135 also has an engaging lip portion 136 projecting away from the body of the housing 110.

The substrate 140 is captured within the well 114 of the housing 110, and is restrained within the well 114 by the recessed ledge 122. The substrate 140 is generally planar and has a first surface 141 and a second surface 142. The substrate 140 is typically made from printed circuit board material. Electrical conductors (not shown) electrically couple the various portions of the substrate 140 including the first and second surfaces 141, 142. Mounting grooves 145 are formed on the substrate 140 to engage the mounting guides 123 of the housing 110.

The connector pins 143 are rigidly affixed to the first surface 141 of the substrate 140 and are carried by the connector housing 110. The connector pins 143 are externally accessible through the mating interface 126 of the connector housing 110. Preferably, the connector pins 143 are pogo pins which have retractable portions to accommodate dimensional tolerances within the connector 100, thus ensuring a consistent presentation of the electrical contacts. Electrical conductors (not shown) within the substrate 140 electrically couple the connector pins 143 to ports on the second surface 142 of the substrate 140, and to cable conductors (not shown) which transfer electrical signals from the connector 100.

The base plate 150 is formed from a plastic material. Openings 152 within the base plate 150 accommodate the connector pins 143 when the base plate 150 is properly aligned with the substrate 140. When assembled, the base plate 150 fits over the substrate 140 and over the connector pins 143, such that the connector pins 143 extend through the base plate 150. Attachment of the base plate 150 to the housing 110 is provided through a first mounting extension 155 which fits within the retainer 125 on the interior surface 120 of the housing 110, and a second mounting extension 156 which fits within the channel 124 on the interior surface 120 of the housing 110. The base plate 150 is rigidly secured within the well 114 of the housing 110 when the mounting extensions 155, 156 engage the retainer 125 and channel 124 of the housing 110. The compressible seal 160 is formed from a flexible material such as rubber, and has openings 162 to accommodate the connector pins 143. Raised reinforced portions 163 are located on opposing ends of the seal 160. The seal 160 mounts over the base plate 150 and is substantially contained within the well 114 of the housing 110.

FIG. 3 shows a perspective view of the assembled connector 100. Note that the connector pins 143 extend through the seal 160 such that the retractable portions of the pins protrude beyond the interface portion of the housing 110. Note also that the raised portions 163 of the interface seal 160 are situated proximate to the latching members 130, 135 of the connector housing 110.

The importance of the raised portions 163 will be discussed below.

Figure 5:
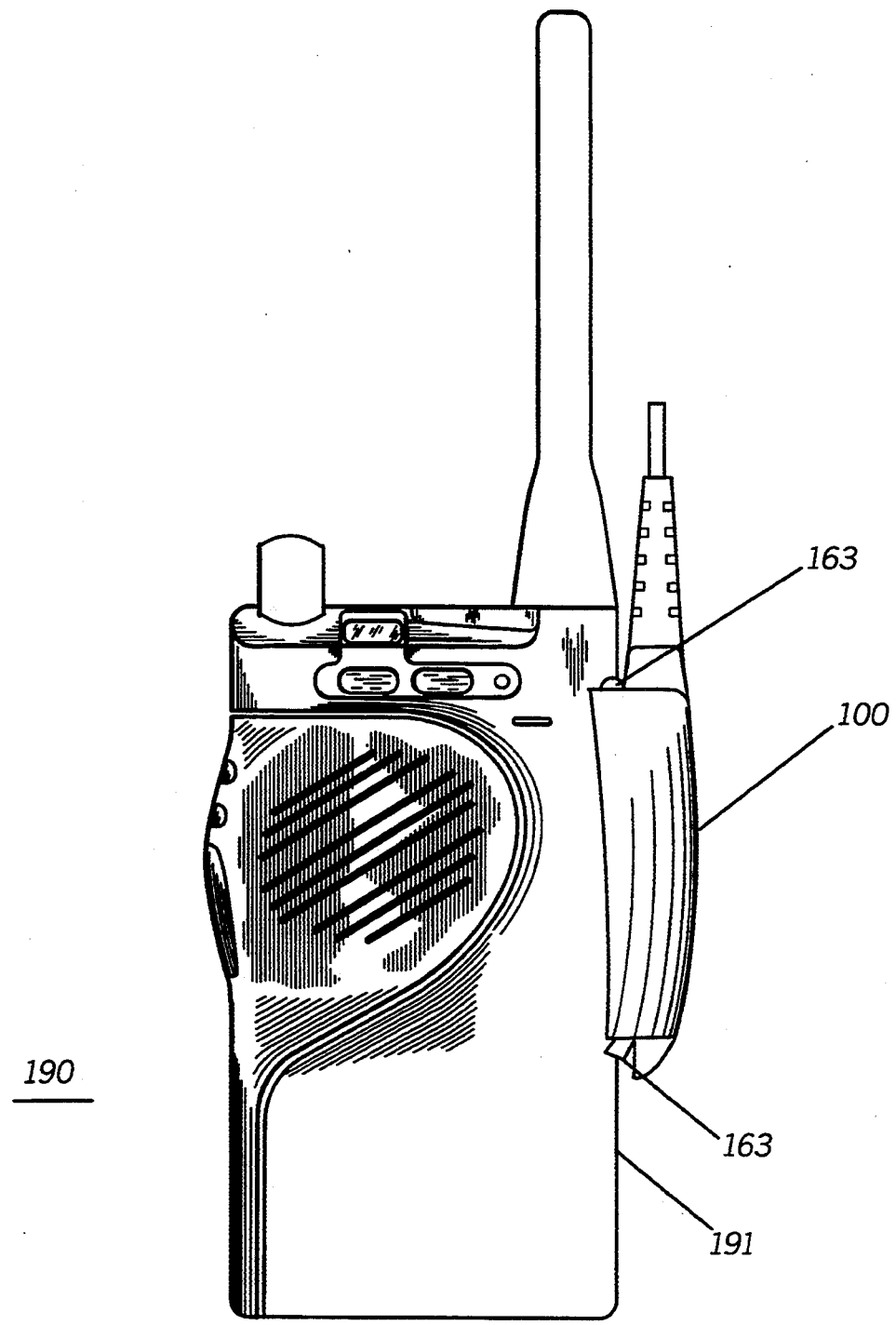
FIG. 5 is front view of the radio of FIG. 4, with the connector assembly of FIG. 3 attached thereto.

FIG. 4 shows an electronic device 190 having an electrical interface. The electronic device is a conventional portable radio 190 used for two-way communications. The radio 190 includes a radio housing 191, which houses well-known communications circuitry for communicating over a radio frequency channel. The radio housing 191 includes an electrical interface dock 192 having a plurality of electrical ports or contacts 193. The interface dock 192 includes first and second connector receptacles or captivating portions 197, 195, located adjacent to the electrical contacts 193, preferably on opposing sides of the contacts 193. The connector receptacles 197, 195 are cavities integrally formed within the radio housing 191. Each receptacle 195, 197 has a recessed undercut portion 198, 196 to engage the connector 100. FIG. 5 shows the connector 100 attached to the radio 190. Note that the raised portions of the seal 163 are forced against the radio housing 191.

Figure 6:
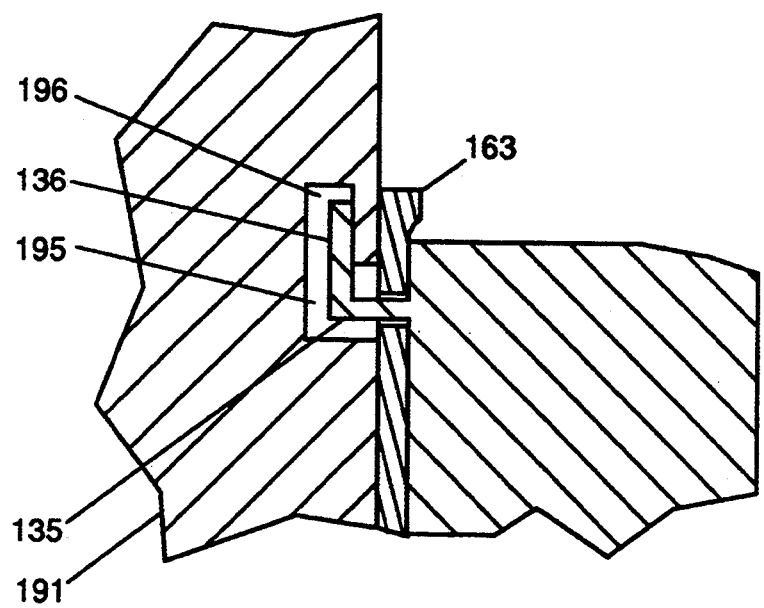
FIG. 6 is a fragmentary cross-sectional view of the connector assembly and radio of FIG. 5, showing details of the attachment mechanism.
Figure 6:
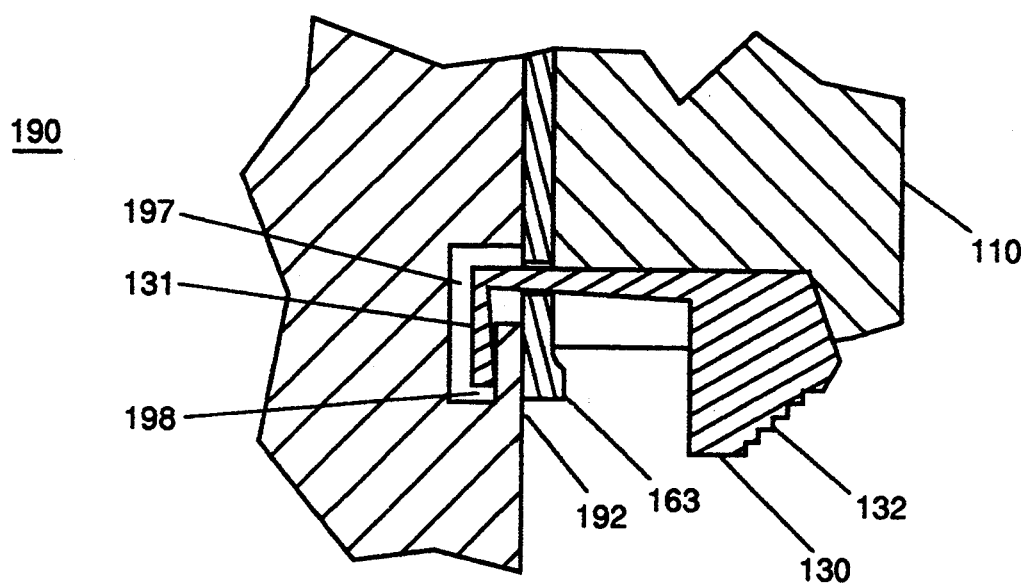

FIG. 6 shows in detail the interaction between the connector receptacles of the interface dock 192 of the radio housing 191, and the latching members 130, 135 of the connector housing 110. The connector 100 is attached to the radio housing 191 by first placing the second latching member 135 within the second receptacle 195 such that the engaging lip 136 of the second latching member 135 engages the undercut portion 196 of the second receptacle 195. Next, the first latching member 130 is depressed about the gripping surface 132, such that the first latching member 130 pivots toward the connector 100, thereby allowing the engaging lip 131 of the first latching member 130 to be inserted within the undercut portion 198 of the first receptacle 197. The connector 100 is then forced against the radio housing 191 to compress the seal 160, and in particular the reinforced portions 163, to allow the engaging lip 131 of the first latching member 130 to be seated within the first receptacle 197. The first latching member 130 is then released, which causes the compression force of the seal 160 to push the engaging lips 131, 136 of the latching members 130, 135 against the undercut portions 198, 196 of the receptacles 197, 195. Thus, the compressible seal 160 is a resilient biasing means for engaging the radio housing 191 and biasing the engaging lip portions 131, 136 of the first and second latching members 130, 135 against the captivating portions 198, 196. This arrangement provides a rigidly secure connection of the connector 100 to the radio housing 191. Consequently, proper electrical coupling between the connector 100 and the interface dock 192 is ensured.

The connector 100, according to the present invention, addresses some of the problems present in the prior art. The connector 100 has integrally formed latching members 130, 135 which combine with complementary captivating portions 195, 197 on the device housing 191 to secure the connector 100 to the device 190. This combination is used to ensure that proper electrical contact is maintained between electrical contacts 143 on the connector 100 and electrical ports 193 on the device 190. As the captivating portions 195, 197 can be integrally formed within the device housing 191, no additional components are required on the device 190. Furthermore, the attachment mechanism is hand operable and convenient to use. Thus, operational convenience has been improved and overall manufacturing costs lowered.

What is claimed:

1. A connector assembly for electrically interfacing to an electronic device, the electronic device having an interface with first and second captivating portions, the connector assembly comprising:
   a connector housing;
   a plurality of electrical contacts carried by the connector housing;
   a first latching member pivotably attached to the connector housing, and having an engaging portion to engage the first captivating portion of the device;
   a second latching member attached to the connector housing, the second latching member having an engaging portion to engage the second captivating portion of the device; and
   resilient biasing means for engaging the device and biasing the engaging portions of the first and second latching members against the captivating portions.

2. The connector assembly of claim 1, wherein the resilient biasing means comprises a compressible seal mounted on the connector.

3. The connector assembly of claim 1, wherein the first latching member is integrally formed on the connector housing.

4. The connector assembly of claim 1, wherein the first latching member has a surface with friction enhancers disposed thereon.

5. The connector assembly of claim 1, wherein the second latching member is integrally formed on the connector housing.

6. The connector assembly of claim 1, wherein the second latching member is substantially rigid.

7. The connector assembly of claim 1, further comprising:
   a substrate mounted within the connector housing; and
   wherein the electrical contacts comprise retractable pogo pins mounted on the substrate.

8. A radio accessory connector assembly for electrically interfacing to a radio, the radio having an interface with first and second captivating portions, the radio accessory connector assembly comprising:
   a connector housing;
   a plurality of electrical contacts carried by the connector housing;
   a first latching member pivotably attached to the connector housing, and having an engaging portion to engage the first captivating portion of the radio;
   a second latching member attached to the connector housing, the second latching member having an engaging portion to engage the second captivating portion of the radio; and
   resilient biasing means for engaging the radio and biasing the engaging portions of the first and second latching members against the captivating portions.

9. The radio accessory connector assembly of claim 8, wherein the resilient biasing means comprises a compressible seal mounted on the connector.

10. The radio accessory connector assembly of claim 8, wherein the first latching member is integrally formed on the connector housing.

11. The radio accessory connector assembly of claim 8, wherein the first latching member has a gripping surface with friction enhancers disposed thereon.

12. The radio accessory connector assembly of claim 8, further comprising:
    a substrate mounted within the connector housing; and
    wherein the electrical contacts comprise retractable pogo pins mounted on the substrate.

13. A radio accessory connector assembly for electrically interfacing to a radio, the radio having an interface with first and second captivating portions, the radio accessory connector assembly comprising:
    a connector housing;
    a substrate mounted within the connector housing;
    a plurality of retractable pogo pins mounted on the substrate;
    a pivotable latching member integrally formed on the connector housing, and having an engaging portion to engage the first captivating portion of the radio;
    a second latching member attached to the connector housing, the second latching member having an engaging portion to engage the second captivating portion of the radio; and
    a compressible seal mounted on the connector, the seal formed to engage the radio and to bias the engaging portions of the first and second latching members against the captivating portions when the connector is connected to the radio.

14. A radio and accessory connector assembly, comprising:
    a radio housing having an interface with first and second captivating portions;
    an accessory connector engaging the radio, the connector comprising:
      a connector housing;
      a substrate mounted within the connector housing;
      a plurality of retractable pogo pins mounted on the substrate;
      a pivotable latching member integrally formed on the connector housing, and having an engaging portion to engage the first captivating portion of the radio;
      a second latching member attached to the connector housing, the second latching member having an engaging portion to engage the second captivating portion of the radio; and
      a compressible seal mounted on the connector, the seal formed to engage the radio and to bias the engaging portions of the first and second latching members against the captivating portions when the connector is connected to the radio.

* * * * *